(12) United States Patent
Veerasamy

(10) Patent No.: US 8,147,972 B2
(45) Date of Patent: Apr. 3, 2012

(54) COATED ARTICLE WITH ION TREATED UNDERLAYER AND CORRESPONDING METHOD

(75) Inventor: Vijayen S. Veerasamy, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 345 days.

(21) Appl. No.: 12/453,645

(22) Filed: May 18, 2009

(65) Prior Publication Data

US 2009/0226714 A1 Sep. 10, 2009

Related U.S. Application Data

(62) Division of application No. 10/875,497, filed on Jun. 25, 2004, now Pat. No. 7,550,067.

(51) Int. Cl.
*B32B 17/06* (2006.01)
*B32B 9/04* (2006.01)

(52) U.S. Cl. ........ 428/428; 428/432; 428/433; 428/434; 428/689; 428/698; 428/697; 428/704

(58) Field of Classification Search .................. 428/428, 428/432, 433, 434, 689, 698, 697, 704
See application file for complete search history.

(56) References Cited

U.S. PATENT DOCUMENTS

| | | | | |
|---|---|---|---|---|
| 3,549,411 A | * | 12/1970 | Bean et al. ............ | 438/791 |
| 4,737,379 A | * | 4/1988 | Hudgens et al. ........ | 427/575 |
| 4,851,095 A | | 7/1989 | Scobey et al. | |
| 5,015,353 A | | 5/1991 | Hubler et al. | |
| 5,268,217 A | * | 12/1993 | Kimock et al. ............ | 428/216 |
| 5,425,861 A | | 6/1995 | Hartig et al. | |
| 5,443,862 A | | 8/1995 | Buffat et al. | |
| 5,514,476 A | | 5/1996 | Hartig et al. | |
| 5,569,362 A | | 10/1996 | Lerbet et al. | |
| 5,968,611 A | * | 10/1999 | Kaloyeros et al. ............ | 427/579 |
| 6,261,693 B1 | | 7/2001 | Veerasamy | |
| 6,350,397 B1 | * | 2/2002 | Heikkila et al. ................ | 264/39 |
| 6,359,388 B1 | | 3/2002 | Petrmichl | |
| 6,395,333 B2 | | 5/2002 | Veerasamy | |
| 6,425,987 B1 | | 7/2002 | Lee et al. | |
| 6,447,891 B1 | | 9/2002 | Veerasamy et al. | |
| 6,461,731 B1 | | 10/2002 | Veerasamy et al. | |

(Continued)

FOREIGN PATENT DOCUMENTS

EP 0 636 702 2/1995

(Continued)

OTHER PUBLICATIONS

Vila et al, Mechanical Properties of Sputtered Silicon Nitride Thin Films, Dec. 15, 2003, Journal of Applied Physics, vol. 94, No. 12, pp. 7868-7873.*

(Continued)

*Primary Examiner* — Gwendolyn Blackwell
(74) *Attorney, Agent, or Firm* — Nixon & Vanderhye P.C.

(57) ABSTRACT

A coated article is provided that may be used as a vehicle windshield, insulating glass (IG) window unit, or the like. Ion beam treatment is performed on a layer(s) of the coating. For example, a silicon nitride layer of a low-E coating may be ion beam treated. It has been found that ion beam treatment, for example, of a silicon nitride underlayer is advantageous in that sodium migration from the glass substrate toward the IR reflecting layer(s) can be reduced during heat treatment.

21 Claims, 7 Drawing Sheets

U.S. PATENT DOCUMENTS

| | | |
|---|---|---|
| 6,495,251 B1 | 12/2002 | Arbab et al. |
| 6,576,349 B2 | 6/2003 | Lingle et al. |
| 6,589,658 B1 | 7/2003 | Stachowiak |
| 6,592,992 B2 | 7/2003 | Veerasamy |
| 6,592,993 B2 | 7/2003 | Veerasamy |
| 6,596,399 B2 | 7/2003 | Veerasamy |
| 6,602,371 B2 | 8/2003 | Veerasamy |
| 6,623,846 B2 | 9/2003 | Laird |
| 6,627,317 B2 | 9/2003 | Wang |
| 6,660,340 B1 | 12/2003 | Kirkpatrick |
| 6,663,753 B2 | 12/2003 | Veerasamy et al. |
| 6,665,033 B2 | 12/2003 | Callegari et al. |
| 6,667,121 B2 | 12/2003 | Wang |
| 6,689,476 B2 | 2/2004 | Veerasamy et al. |
| 6,706,363 B2 | 3/2004 | Honda et al. |
| 6,713,178 B2 | 3/2004 | Veerasamy |
| 6,723,211 B2 | 4/2004 | Lingle et al. |
| 7,550,067 B2 | 6/2009 | Veerasamy |
| 2002/0064662 A1 | 5/2002 | Lingle et al. |
| 2003/0150711 A1 | 8/2003 | Laird |
| 2003/0194567 A1 | 10/2003 | Lingle et al. |
| 2003/0194570 A1 | 10/2003 | Lingle et al. |
| 2003/0235719 A1 | 12/2003 | Grimal et al. |
| 2004/0067362 A1 | 4/2004 | Veerasamy et al. |
| 2004/0067363 A1 | 4/2004 | Bienkiewicz et al. |
| 2009/0324844 A1* | 12/2009 | Haoto et al. ........... 427/527 |

FOREIGN PATENT DOCUMENTS

| | | |
|---|---|---|
| EP | 1 273 558 | 1/2003 |

OTHER PUBLICATIONS

"Developments in Ion-Assisted Coatings", Dearnaley, Surface and Coatings Technology, 33 (1987).

"Effects of Bombardment on Optical Properties during the Deposition of Silicon Nitride by Reactive Ion-Beam Sputtering", Lambrinos et al., Applied Optics, vol. 35, No. 19, Jul. 1, 1996.

U.S. Appl. No. 10/875,497, filed Jun. 25, 2004; Veerasamy.

International Search Report mailed Oct. 12, 2005.

Ray et al., "Effect of Reactive-ion Bombardment on the Properties of Silicon Nitride and Oxynitride Deposited by Ion-Beam Sputtering", J. Appl. Phys. 75 (12), pp. 8145-8152, Jun. 15, 1994.

* cited by examiner

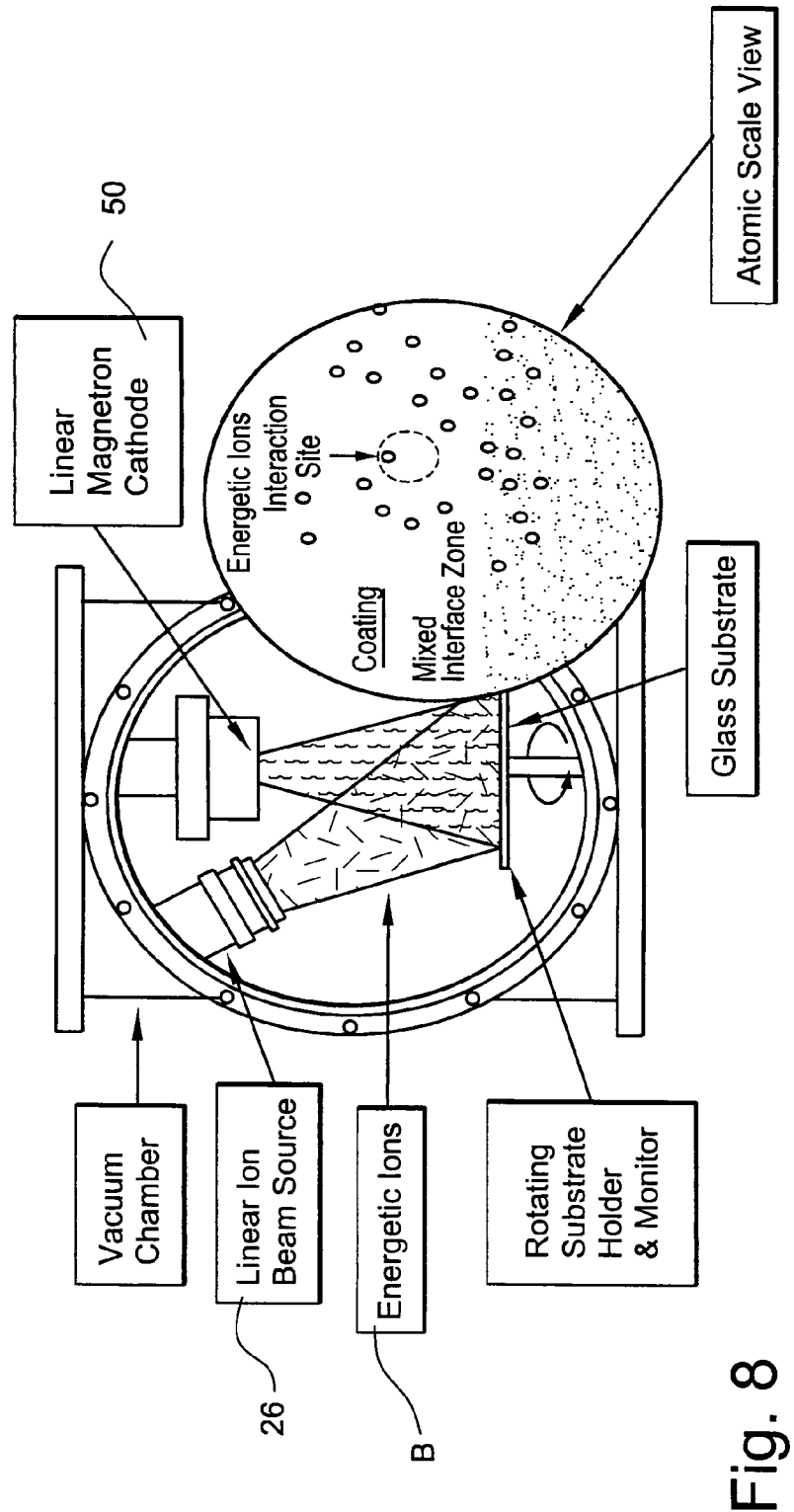

COATED ARTICLE WITH ION TREATED UNDERLAYER AND CORRESPONDING METHOD

This application is a divisional of application Ser. No. 10/875,497, filed Jun. 25, 2004 now U.S. Pat. No. 7,550,067, the entire disclosure of which is hereby incorporated herein by reference in this application.

This invention relates to a coated article including a solar control coating such as a low-E coating. In certain example embodiments, the low-E coating includes a layer (e.g., an undercoat layer) which is ion treated. In certain example embodiments, an undercoat layer comprising silicon nitride is ion beam treated simultaneously with sputtering. Coated articles according to certain example embodiments of this invention may be used in the context of vehicle windshields, insulating glass (IG) window units, other types of windows, or in any other suitable application.

BACKGROUND OF THE INVENTION

Coated articles are known in the art for use in window applications such as insulating glass (IG) window units, vehicle windows, and/or the like. Example non-limiting low-emissivity (low-E) coatings are illustrated and/or described in U.S. Patent Document Nos. 6,723,211; 6,576,349; 6,447,891; 6,461,731; 3,682,528; 5,514,476; 5,425,861; and 2003/0150711, the disclosures of which are all hereby incorporated herein by reference.

In certain situations, designers of coated articles with low-E coatings often strive for a combination of high visible transmission, substantially neutral color, low emissivity (or emittance), low sheet resistance ($R_s$), and good durability. High visible transmission for example may permit coated articles to be more desirable in applications such as vehicle windshields or the like, whereas low-emissivity (low-E) and low sheet resistance ($R_s$) characteristics permit such coated articles to block significant amounts of IR radiation so as to reduce for example undesirable heating of vehicle or building interiors. It is often difficult to obtain high visible transmission and adequate solar control properties, combined with good durability because materials used to improve durability often cause undesirable drops in visible transmission and/or undesirable color shifts of the product upon heat treatment.

Coated articles used in windows (e.g., vehicle windows, architectural windows, or the like) often must be heat treated (e.g., thermally tempered, heat bent and/or heat strengthened). However, a problem which frequently occurs with heat treatment is sodium (Na) migration into the coating from the glass substrate. For instance, during heat treatment (HT) sodium tends to migrate from the glass substrate into the coating and can severely damage the infrared (IR) reflecting layer(s) (e.g., silver layer or layers) if such migrating sodium reaches the same.

It has been proposed to use sputter-deposited silicon nitride as a base layer for coatings in an effort to reduce sodium migration which can occur during heat treatment. However, silicon nitride formed only by sputtering is problematic in certain respects. FIG. 1 of the instant application, for example, illustrates that sputter-deposited silicon nitride layers realize an increase in voids defined therein as sputter deposition rate increases (the data in FIG. 1 is from silicon nitride deposited only via sputtering in a known manner). A large number of voids in a base layer of silicon nitride can be undesirable since sodium can migrate through the layer during heat treatment via such voids, and attack the IR reflecting layer(s) leading to structural damage and/or coating failure. For example, such sodium attacks can increase haze in the heat treated coated article and/or can adversely affect optical characteristics of the coated article following heat treatment.

U.S. Pat. No. 5,569,362 discloses a technique for ion beam treating a coating using at least oxygen in order to densify the same. However, the '362 patent is unrelated to nitrogen doping $Si_3N_4$, is unrelated to heat treated products and problems which may arise upon heat treatment, and is undesirable in that it's use of significant amounts of oxygen in the ion beam renders treated layers and layers adjacent thereto susceptible to significant undesirable change upon heat treatment.

In view of the above, it will be apparent to those skilled in the art that there exists a need for a method of making a coated article with an ion beam treated layer in a manner suitable to at least one of: (a) improve optical characteristics of the coated article such as haze reduction and/or coloration following optional heat treatment; (b) improve durability of the coated article; and/or (c) reduce the potential for significant changing of optical characteristics of the coating upon heat treatment. There also exists a need for corresponding coated articles.

BRIEF SUMMARY OF EXAMPLE EMBODIMENTS OF THE INVENTION

In certain example embodiments of this invention, ion treatment of a layer(s) is used to control and/or modify stoichiometry of the layer(s) in a coating (i.e., stoichiometry modification and/or control).

It has been found that ion beam treatment of a layer (e.g., silicon nitride inclusive layer) unexpectedly results in reduced sodium (Na) migration therethrough during heat treatment (HT) of the coated article, thereby improving optical characteristics thereof.

Ion beam treatment of overcoat layers may be used to improve durability of the coated article, whereas ion beam treatment of other layers such as base or underlayers may be used to reduce possible sodium migration during optional heat treatment and/or improve durability.

In different embodiments of this invention, the ion beam treatment may be performed: (a) after the layer has been sputter-deposited, and/or (b) while the layer is being sputter-deposited. The former case may be referred to as peening, while the latter case may be referred to as ion beam assisted deposition (IBAD) in certain example instances. IBAD type ion beam treatment, performed simultaneously with sputtering, is often preferred for ion beam treating base layers to reduce sodium migration.

In certain example embodiments of this invention, the ion beam treatment is performed in a manner so as to cause part or all of a silicon nitride inclusive layer to become nitrogen-rich (N-rich). In such embodiments, dangling Si bonds are reduced or eliminated, and excess nitrogen is provided in the layer. This may in certain instances be referred to as a solid solution of N-doped silicon nitride. Thus, in certain example instances, the layer may comprise $Si_3N_4$ which is additionally doped with more nitrogen. In certain example embodiments, the $Si_3N_4$ may be doped with at least 0.1% (atomic %) more nitrogen, more preferably from about 0.5 to 20% more nitrogen, even more preferably from about 1 to 10% more nitrogen, and most preferably from about 2 to 10% more nitrogen (or excess nitrogen). Unlike the nitrogen in the $Si_3N_4$ of the layer, the excess nitrogen (or the doping nitrogen referenced above) is not bonded to Si (but may or may not be bonded to other element(s)). This nitrogen doping of $Si_3N_4$ may be present in either the entire layer comprising silicon nitride, or alternatively in only a part of the layer comprising silicon nitride (e.g., proximate an upper surface thereof in peening embodiments).

Surprisingly, it has been found that this excess nitrogen in the layer (i.e., due to the N-doping of $Si_3N_4$) is advantageous in that it results in less structural defects, reduced sodium migration during optional heat treatment when used in a layer under an IR reflecting layer(s), and renders the layer less reactive to oxygen thereby improving durability characteristics.

In certain example embodiments of this invention, at least nitrogen (N) ions are used to ion treat a layer comprising silicon nitride. In certain example embodiments, using an ion beam treatment post-sputtering (i.e., peening), such an ion beam treatment may include utilizing an energy of at least about 550 eV per $N_2^+$ ion, more preferably from about 550 to 1,200 eV per $N_2^+$ ion, even more preferably from about 600 to 1100 eV per $N_2^+$ ion, and most preferably from about 650 to 900 eV per $N_2^+$ ion (an example is 750 eV per $N_2^+$ ion). It has surprisingly been found that such ion energies permit excellent nitrogen grading characteristics to be realized in a typically sputter-deposited layer of suitable thickness, significantly reduce the number of dangling Si bonds at least proximate the surface of the layer comprising silicon nitride, provide improved stress characteristics to the coating/layer, provide excellent doping characteristics, reduce the potential for sodium migration, and/or cause part or all of the layer to become nitrogen-rich (N-rich) which is advantageous with respect to durability. Possibly, such post-sputtering ion beam treatment may even cause the stress of the layer to change from tensile to compressive in certain example instances.

In IBAD embodiments where the ion beam treatment is performed simultaneously with sputtering of the layer, it has surprisingly been found that a lower ion energy of at least about 100 eV per $N_2^+$ ion, more preferably of from about 200 to 1,000 eV per $N_2^+$ ion, more preferably from about 200 to 600 eV per $N_2^+$ ion, still more preferably from about 300 to 500 eV per $N_2^+$ ion (example of 400 eV per $N_2^+$ ion) is most suitable at the surface being treated. It has surprisingly been found that such ion energies in IBAD embodiments significantly reduce the number of dangling Si bonds, provide improved stress characteristics to the coating/layer, provide excellent doping characteristics, reduce sodium migration during heat treatment, and/or cause part or all of the layer to become nitrogen-rich (N-rich) which is advantageous with respect to durability.

In certain example embodiments, the use of ion treatments herein may speed up the manufacturing process by permitting faster speeds to be used in sputter depositing certain layer(s) of a coating without suffering from significant durability problems.

In certain example embodiments of this invention, there is provided a method of making a coated article, the method comprising: providing a glass substrate; forming a layer comprising silicon nitride on the substrate; ion beam treating the layer comprising silicon nitride in a manner so as to cause at least part of the layer comprising silicon nitride to comprise nitrogen-doped $Si_3N_4$; and forming an infrared (IR) reflecting layer comprising silver on the substrate over at least the ion beam treated layer comprising silicon nitride.

In other example embodiments of this invention, there is provided a method of making a coated article, the method comprising: providing a glass substrate; forming a layer comprising silicon nitride on the substrate; ion beam treating the layer comprising silicon nitride in a manner so as to cause the layer comprising silicon nitride to have an average hardness of at least 20 GPa; and forming an infrared (IR) reflecting layer on the glass substrate over at least the ion beam treated layer comprising silicon nitride.

In other example embodiments of this invention, there is provided a coated article including a glass substrate which supports a coating thereon, the coating comprising at least the following layers: a layer comprising silicon nitride supported by the glass substrate; an IR reflecting layer located on and supported by the substrate, the IR reflecting layer being located over at least the layer comprising silicon nitride; and wherein the layer comprising silicon nitride comprises nitrogen-doped $Si_3N_4$.

In still further example embodiments of this invention, there is provided a coated article including a glass substrate which supports a coating thereon, comprising at least the following layers: a layer comprising silicon nitride which has an average hardness of at least 20 GPa; an IR reflecting layer located on the substrate over at least the layer comprising silicon nitride; and wherein the coated article has a visible transmission of at least about 70% and a sheet resistance of less than or equal to about 6 ohms/square.

BRIEF DESCRIPTION OF THE DRAWINGS

FIG. 8 is a diagram illustrating ion beam assisted deposition (IBAD) of a layer according to an example embodiment of this invention; this may be used to ion beam treat any layer mentioned herein that can be ion beam treated.

DETAILED DESCRIPTION OF EXAMPLES OF THE INVENTION

Figure 1:
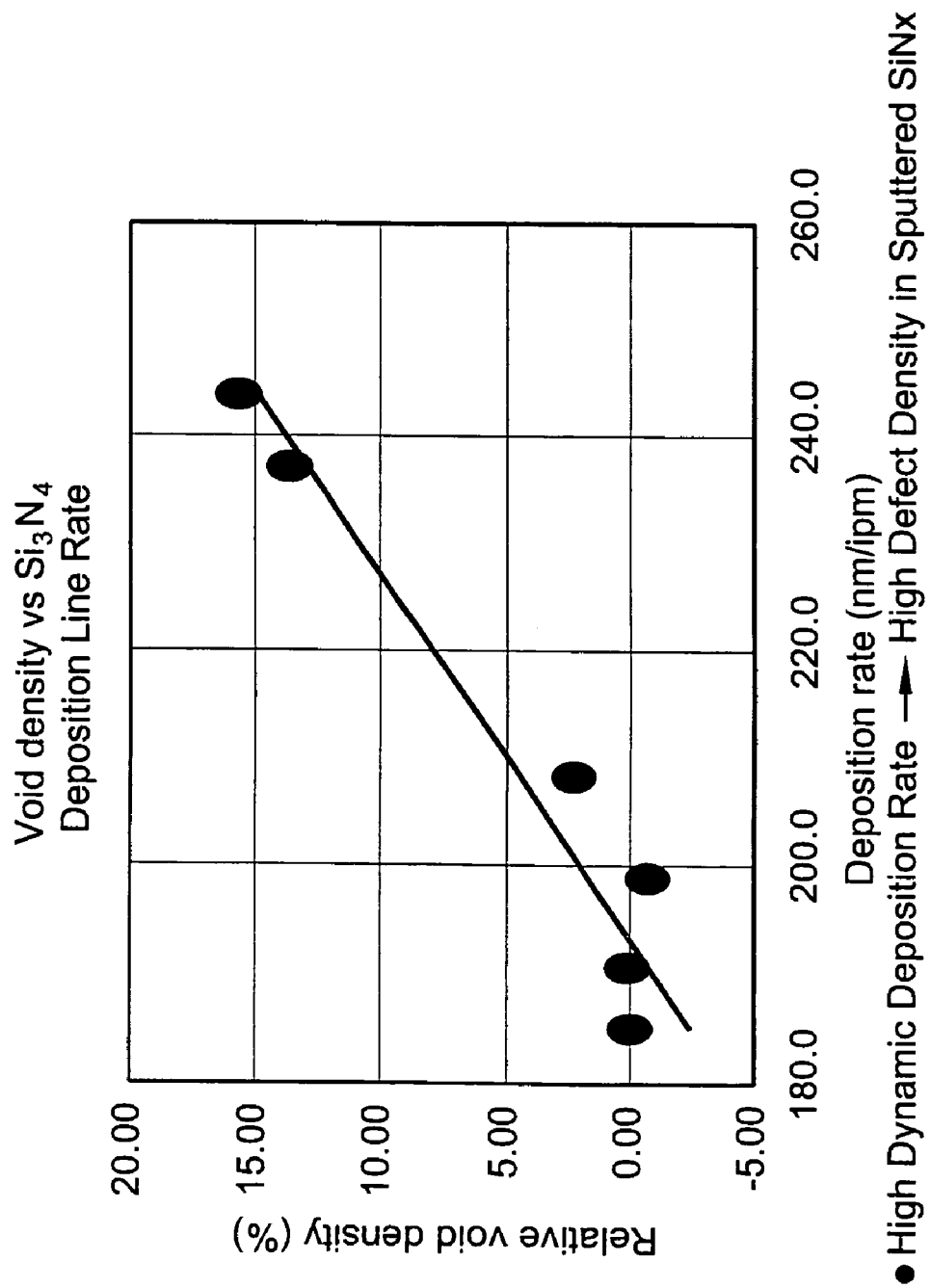
FIG. 1 is a graph illustrating void formation as a function of sputter-deposition rate for silicon nitride.

Referring now to the accompanying drawings in which like reference numerals indicate like parts throughout the several views.

Coated articles herein may be used in applications such as vehicle windshields, monolithic windows, IG window units, and/or any other suitable application that includes single or multiple glass substrates with at least one solar control coating thereon. In vehicle windshield applications, for example, a pair of glass substrates may be laminated together with a polymer based layer of a material such as PVB, and the solar control coating (e.g., low emissivity or low-E coating) is provided on the interior surface of one of the glass substrates adjacent the polymer based layer. In certain example embodiments of this invention, the solar control coating (e.g., low-E coating) includes a double-silver stack, although this invention is not so limited in all instances (e.g., single silver stacks and other layer stacks may also be used in accordance with certain embodiments of this invention).

In certain example instances, it has surprisingly been found that the ion treatment, if performed with a particular ion energy for a particular material, may be performed in a manner which causes a lower layer to realize improved resistance to sodium migration upon optional heat treatment. It has been found that ion beam treatment of a layer (e.g., silicon nitride inclusive layer) unexpectedly results in reduced sodium (Na) migration therethrough during heat treatment (HT) of the coated article, thereby improving optical characteristics thereof. IBAD (e.g., see FIG. 8) is particularly beneficial in this regard. The ion beam treatment of silicon nitride with at least nitrogen ions results in a more stoichiometric layer, and reduces the layer's susceptibility to oxidation and sodium migration therethrough.

In certain example embodiments of this invention, silicon nitride inclusive base layer(s) and/or overcoat layer(s) may be ion beam treated in such a manner (e.g., via IBAD).

In different embodiments of this invention, the ion beam treatment of a silicon nitride inclusive base layer, silicon nitride inclusive overcoat layer, and/or any other ion beam treatable layer discussed herein, may be performed: (a) while the layer is being sputter-deposited, and/or (b) after the layer has been sputter-deposited. The latter case (b) may be referred to as peening, while the former case (a) may be referred to as ion beam assisted deposition (IBAD) in certain example instances. IBAD embodiments (e.g., see FIG. 8) are particularly useful for unexpectedly causing a deposited layer to realize anti-migration characteristics regarding sodium migration. However, post-sputtering ion beam treatment (or peening) may also be used in any ion beam treatment embodiment herein.

In certain example embodiments of this invention, ion beam treatment is performed in a manner so as to cause part or all of a silicon nitride inclusive layer to become nitrogen-rich (N-rich). In such embodiments, dangling Si bonds are reduced or eliminated, and excess nitrogen is provided in the layer (e.g., see layer 3 and/or 25). This may in certain instances be referred to as a solid solution of N-doped silicon nitride. Thus, in certain example instances, the layer(s) may comprise $Si_3N_4$ which is additionally doped with more nitrogen. In certain example embodiments, the $Si_3N_4$ may be doped with at least 0.1% (atomic %) nitrogen, more preferably from about 0.5 to 20% nitrogen, even more preferably from about 1 to 10% nitrogen, and most preferably from about 2 to 10% nitrogen (or excess nitrogen). In certain example instances, the nitrogen doping may be at least about 2% nitrogen doping. Unlike the nitrogen in the $Si_3N_4$ of the layer, the excess nitrogen (or the doping nitrogen referenced above) is not bonded to Si (but may or may not be bonded to other element(s)). This nitrogen doping of $Si_3N_4$ may be present in either the entire layer comprising silicon nitride, or alternatively in only a part of the layer comprising silicon nitride (e.g., proximate an upper surface thereof in peening embodiments).

Surprisingly, it has been found that this excess nitrogen in the layer (i.e., due to the N-doping of $Si_3N_4$) is advantageous in that it results in less structural defects, reduced sodium migration during optional heat treatment when used in a layer under an IR reflecting layer(s), and renders the layer less reactive to oxygen thereby improving durability characteristics.

In certain example embodiments of this invention, at least nitrogen (N) ions are used to ion treat a layer(s) comprising silicon nitride. In certain example embodiments, using an ion beam treatment post-sputtering (i.e., peening), such an ion beam treatment may include utilizing an energy of at least about 550 eV per $N_2^+$ ion, more preferably from about 550 to 1,200 eV per $N_2^+$ ion, even more preferably from about 600 to 1100 eV per $N_2^+$ ion, and most preferably from about 650 to 900 eV per $N_2^+$ ion (an example is 750 eV per $N_2^+$ ion). It has surprisingly been found that such ion energies permit excellent nitrogen grading characteristics to be realized in a typically sputter-deposited layer of suitable thickness, significantly reduce the number of dangling Si bonds at least proximate the surface of the layer comprising silicon nitride, provide improved stress characteristics to the coating/layer, provide excellent doping characteristics, reduce the potential for sodium migration, and/or cause part or all of the layer to become nitrogen-rich (N-rich) which is advantageous with respect to durability. Possibly, such post-sputtering ion beam treatment may even cause the stress of the layer to change from tensile to compressive in certain example instances.

In IBAD embodiments where the ion beam treatment is performed simultaneously with sputtering of the layer (e.g., for layer 3 and/or 25), it has surprisingly been found that a lower ion energy of at least about 100 eV per $N_2^+$ ion, more preferably of from about 200 to 1,000 eV per $N_2^+$ ion, more preferably from about 200 to 600 eV per $N_2^+$ ion, still more preferably from about 300 to 500 eV per $N_2^+$ ion (example of 400 eV per $N_2^+$ ion) is most suitable at the surface being treated. It has surprisingly been found that such ion energies in IBAD embodiments significantly reduce the number of dangling Si bonds, provide improved stress characteristics to the coating/layer, provide excellent doping characteristics, reduce sodium migration during heat treatment, and/or cause part or all of the layer to become nitrogen-rich (N-rich) which is advantageous with respect to durability. It has surprisingly been found that this ion energy range is especially beneficial in causing the silicon nitride layer (3 and/or 25) to realize compressive stress and/or prevent or reduce sodium migration during optional heat treatment. If the ion energy is too low, then the layer will not densify sufficiently. On the other hand, if the ion energy is too high, this could cause damage to the layer and/or cause the stress of the treated layer to flip to tensile. Thus, this ion energy range provides for unexpected and advantageous results.

In certain IBAD embodiments, if the appropriate ion energy is used for a given material, the compressive stress of the IBAD-deposited layer may be from about 50 MPa to 2 GPa, more preferably from about 50 MPa to 1 GPA, and most preferably from about 100 MPa to 800 MPa. Such IBAD techniques may be used in conjunction with base layer(s), overcoat layer(s) or any other layer herein which may be ion beam treated.

Meanwhile, when post-sputtering ion beam treatment (peening) is used after a layer has been sputter-deposited, and when the originally deposited layer realizes tensile stress, this may cause the tensile stress of a layer to drop significantly, or alternatively to switch to compressive. Moreover, in certain example embodiments of this invention, ion beam treatment (e.g., post-sputtering peening) may be used to cause the tensile stress of a sputter-deposited layer to drop to a value less than 100 MPa, more preferably to a value less than 75 MPa, even more preferably to a value less than 50 MPa, and most preferably to a value of from 0-25 MPa. Stress as close to zero as reasonably possible is desirable in certain instances. Such peening techniques may be used in conjunction with base layer(s), overcoat layer(s) or any other layer herein which may be ion beam treated.

In certain example embodiments of this invention, ion beam treatment is used to control and/or modify stoichiometry of a layer(s) in a coating (i.e., stoichiometry modification and/or control). The ion beam performs nanoscale film modifications using inert and/or reactive gas(es), so that depending on the circumstances it is possible to nano-engineer the kinetics of film surface arrangement or rearrangement to as to obtain phases away from thermodynamic equilibrium. The layer(s) to be ion beam treated may be deposited on a substrate such as a glass substrate, and other layer(s) may or may not be located between the glass substrate and the layer(s) to be modified by ion beam treatment. In certain example embodiments, the ion beam treatment may utilize at least nitrogen ions. During the ion beam treating of the layer, ions used in the treating may or may not penetrate the entire layer; the layer is ion treated even if only an upper portion (e.g., upper half, upper third, etc.) of the layer is so treated.

In certain example instances, it has surprisingly been found that the ion treatment may improve durability, heat treatability and/or coloration characteristics of the coated article by at least one of: (i) creating nitrogen-doped $Si_3N_4$ in at least part of the layer, thereby reducing Si dangling bonds and susceptibility to sodium migration upon heat treatment; (ii) creating a nitrogen graded layer in which the nitrogen content is greater in an outer portion of the layer closer to the layer's outer surface than in a portion of the layer further from the layer's outer surface; (iii) increasing the density of the layer which has been ion beam treated, (iv) using an ion energy suitable for causing the stress characteristics of the layer to be improved; (v) improving stoichiometry control of the layer, (vi) causing the layer to be less chemically reactive following ion treatment thereof, (vii) causing the layer to be less prone to significant amounts of oxidation following the ion treatment, and/or (viii) reducing the amount and/or size of voids in the layer which is ion treated. In certain example embodiments of this invention, the ion treatment is treatment using an ion beam from at least one ion source.

In certain example embodiments of this invention, an anode-cathode voltage may be used in an ion beam source (e.g., see FIGS. 6-8) of from about 600 to 4,000 V, more preferably from about 800 to 2,000 V, and most preferably from about 1,000 to 1,700 V (e.g., 1,500 V) for the ion beam treatment.

In certain example embodiments, the use of ion treatments herein may speed up the manufacturing process by permitting faster speeds to be used in sputter depositing certain layer(s) of a coating without significant concern about suffering from significant durability problems. In other words, fast sputtering processing which tends to result in voids in silicon nitride layers may be used since the ion beam treatment reduces the size and/or amount of such voids, and may prevent such voids from occurring.

The ion beam may be a focused ion beam, a collimated ion beam, or a diffused ion beam in different embodiments of this invention.

Coated articles according to different embodiments of this invention may or may not be heat treated (HT) in different instances. The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of at least about 580 degrees C., more preferably at least about 600 degrees C., for a sufficient period to allow tempering, bending, and/or heat strengthening. In certain instances, the HT may be for at least about 4 or 5 minutes. In certain example embodiments of this invention, ion beam treated silicon nitride undercoat and/or overcoat layers are advantageous in that they change less with regard to color and/or transmission during optional heat treatment; this can improve interlayer adhesion and thus durability of the final product; and ion beam treated lower silicon nitride inclusive layers aid in reduction of sodium migration during HT.

Figure 2:
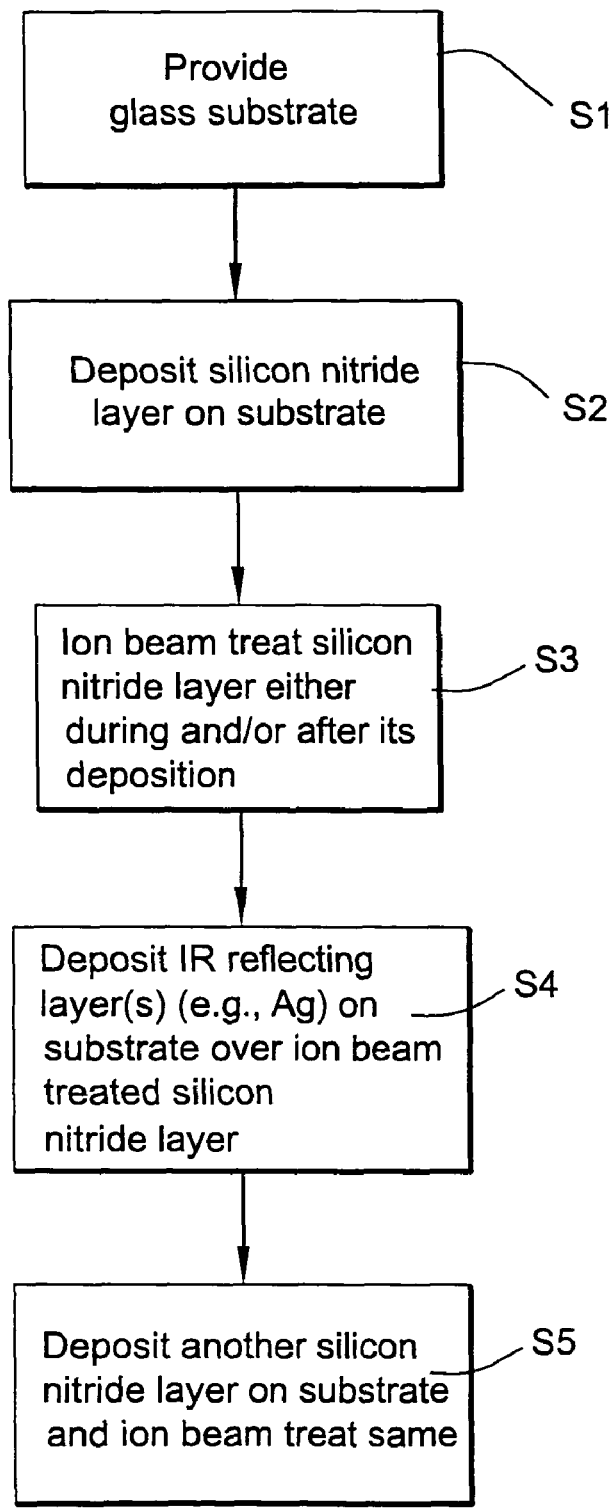
FIG. 2 is a flowchart illustrating certain steps carried out in making a coated article according to an example embodiment of this invention.

FIG. 2 is a flowchart illustrating certain steps carried out according to an example embodiment of this invention. Initially, a glass substrate is provided (S1). At least a layer of or including silicon nitride is then formed on the glass substrate (S2). This silicon nitride layer formed in S2 (step 2) may be formed either directly on and in contact with the glass substrate, or alternatively on the glass substrate with other layer(s) therebetween. The silicon nitride layer is ion beam treated according to any suitable ion beam treatment technique discussed herein (S3). For instance, the silicon nitride layer in S3 may be ion beam treated while the layer is being sputter-deposited (e.g., IBAD) and/or after the layer has been sputter-deposited (e.g., peening). Following the ion beam treatment of the silicon nitride layer, optionally a contact layer comprising zinc oxide may be formed on the substrate. Then, an IR reflecting layer of a material such as silver is then formed (e.g., via sputtering) on the substrate over at least the ion beam treated silicon nitride layer (S4). Since an ion beam treated silicon nitride layer is located between at least the glass substrate and the IR reflecting layer, sodium migration from the glass substrate can be blocked or reduced during heat treatment thereby protecting the IR reflecting layer from the same. After formation of the ER reflecting layer(s) on the glass substrate in S4, it is possible to form another layer of or including silicon nitride on the glass substrate as an overcoat or the like (S5). This additional silicon nitride layer (e.g., overcoat) may also be ion beam treated in any suitable manner discussed herein in order to improve durability of the coated article. It is noted that these layers may be formed via magnetron sputtering, IBAD, sputtering plus subsequent ion beam treatment, or in any other suitable manner in different embodiments of this invention.

It is noted that any of the silicon nitride layers to be ion beam treated herein may be initially sputter deposited in any suitable stoichiometric form including but not limited to $Si_3N_4$ or a Si-rich type of silicon nitride. Example Si-rich types of silicon nitride are discussed in U.S. 2002/0064662 (incorporated herein by reference), and any Si-rich layer discussed therein may be initially sputter-deposited herein for any suitable silicon nitride layer. Also, silicon nitride layers herein may of course be doped with aluminum (e.g., 1-10%) or the like in certain example embodiments of this invention.

Sputtering used for sputter-depositing silicon nitride in a conventional manner (e.g., via magnetron sputtering) is a relatively low energy process. As a result, sputter-deposited silicon nitride layers are not particularly dense. Moreover, because of the relatively low energy involved in sputter-depositing silicon nitride, sputter-deposited silicon nitride layers typically suffer from weak Si—N bonds since at least certain amounts of nitrogen end up trapped in the layer in a manner not well-bonded to silicon, and dangling Si bonds are present. Unfortunately, this results in a rather porous layer which is prone to oxidation and/or sodium migration which can cause optical properties (n and/or k) of the layer and thus the coating to significantly change. For example, environmental elements such as water, humidity, oxygen, cement, and/or the like tend to cause the optical properties of sputter-deposited silicon nitride to vary in an unpredictable manner thereby resulting in possible color and/or transmission changes. In certain example embodiments of this invention, the aforesaid problems with conventional sputter-deposited silicon nitride layers are addressed and remedied by ion treating the silicon nitride layer. Silicon nitride growth from ions has been found to be better than growth from neutrals such as in sputtering. In particular, the increased kinetic energy obtained in ion treating the silicon nitride layer helps the layer to grow and/or form in a more dense manner and/or with improved stoichiometry (e.g., with better Si—N bonding). The higher density and stronger bonds following ion treatment of the silicon nitride are advantageous with regard to durability, sodium migration, and the like. Moreover, it has surprisingly been found that the excess nitrogen in the layer 3 as a result of the doping tends to reduce sodium migration during heat treatment.

It has also been found that ion beam treating of a layer comprising silicon nitride increases the hardness of such a layer according to certain example embodiments of this invention (e.g., via IBAD or peening). A layer comprising silicon nitride when conventionally sputtered typically has a hardness of from 10-14 GPa. In certain example embodiments of this invention however, when ion beam treated, the silicon nitride layer realizes a hardness of at least 20 GPa, more preferably of at least 22 GPa, and most preferably of at least 24 GPa.

Figure 3:
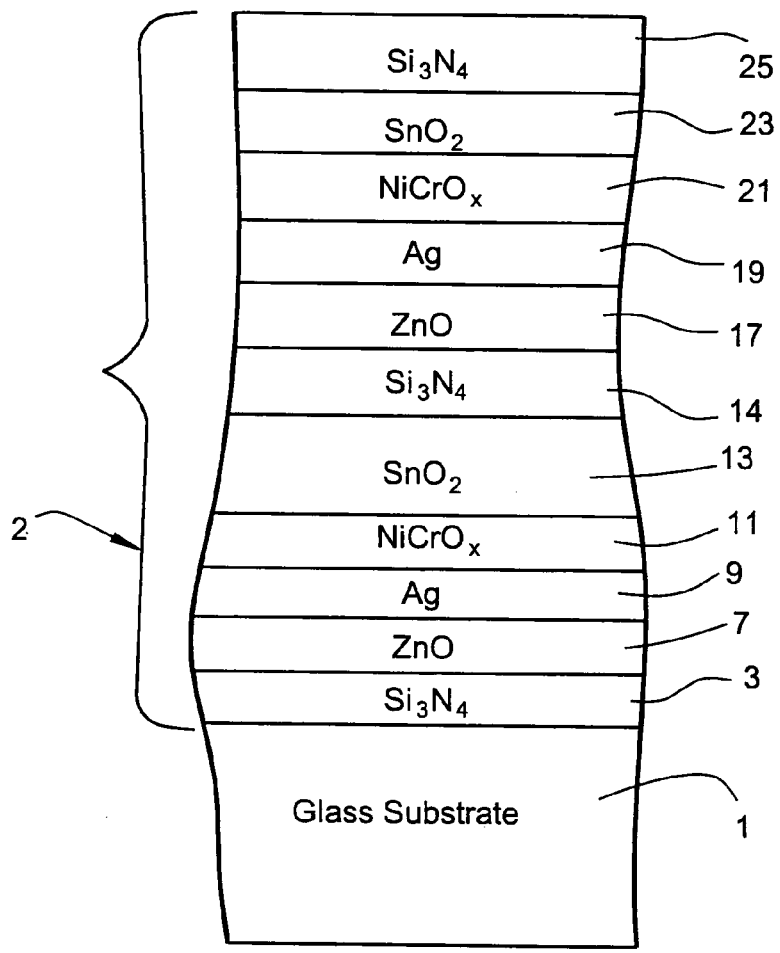
FIG. 3 is a cross sectional view of a coated article according to an example embodiment of this invention.

FIG. 3 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and a low-E coating (or layer system) 2 provided on the substrate 1 either directly or indirectly. The coating (or layer system) 2 includes, in this example embodiment: dielectric silicon nitride layer 3 (which may be ion beam treated) which may be of $Si_3N_4$, nitrogen doped type, or of any other suitable stoichiometry of silicon nitride in different embodiments of this invention, first lower contact layer 7 (which contacts IR reflecting layer 9), first conductive and preferably metallic or substantially metallic infrared (IR) reflecting layer 9, first upper contact layer 11 (which contacts layer 9), dielectric layer 13 (which may be deposited in one or multiple steps in different embodiments of this invention), another silicon nitride layer 14, second lower contact layer 17 (which contacts IR reflecting layer 19), second conductive and preferably metallic IR reflecting layer 19, second upper contact layer 21 (which contacts layer 19), dielectric layer 23, and finally dielectric silicon nitride overcoat layer 25 (which may be ion beam treated). The "contact" layers 7, 11, 17 and 21 each contact at least one IR reflecting layer (e.g., layer based on Ag). The aforesaid layers 3-25 make up low-E (i.e., low emissivity) coating 2 which is provided on glass or plastic substrate 1. Silicon nitride layer 25 is the outermost layer of the coating 2. Ion beam treatments discussed herein are directed toward, for example, silicon nitride inclusive layers 3 and 25.

In monolithic instances, the coated article includes only one glass substrate 1 as illustrated in FIG. 3. However, monolithic coated articles herein may be used in devices such as laminated vehicle windshields, IG window units, and the like. A laminated vehicle window such as a windshield includes first and second glass substrates laminated to one another via a polymer based interlayer (e.g., see U.S. Pat. No. 6,686,050, the disclosure of which is incorporated herein by reference). One of these substrates of the laminate may support coating 2 on an interior surface thereof in certain example embodiments. As for IG window units, an IG window unit may include two spaced apart substrates 1. An example IG window unit is illustrated and described, for example, in U.S. Pat. No. 6,632,491, the disclosure of which is hereby incorporated herein by reference. An example IG window unit may include, for example, the coated glass substrate 1 shown in FIG. 3 coupled to another glass substrate via spacer(s), sealant(s) or the like with a gap being defined therebetween. This gap between the substrates in IG unit embodiments may in certain instances be filled with a gas such as argon (Ar). An example IG unit may comprise a pair of spaced apart clear glass substrates each about 4 mm thick one of which is coated with a coating herein in certain example instances, where the gap between the substrates may be from about 5 to 30 mm, more preferably from about 10 to 20 mm, and most preferably about 16 mm. In certain example instances, the coating 2 may be provided on the interior surface of either substrate facing the gap.

In certain example embodiments of this invention, one or both of upper contact layer(s) 11 and/or 21 may be oxidation graded. Thus, at least one of NiCr inclusive contact layers 11 and/or 21 may be been ion beam treated with at least oxygen ions in order to oxidation graded the same in certain example embodiments of this invention.

Example details relating to layers 3, 7, 9, 11, 13, 14, 17, 19, 21, 23 and 25 of the FIG. 3 coating are discussed in U.S. patent application Ser. No. 10/800,012, the disclosure of which is hereby incorporated herein by reference. For example, dielectric layers 3 and 14 may be of or include silicon nitride in certain embodiments of this invention. Silicon nitride layers 3 and 14 may, among other things, improve heat-treatability of the coated articles, e.g., such as thermal tempering or the like. The silicon nitride of layers 3 and/or 14 may be of the stoichiometric type ($Si_3N_4$) type, nitrogen doped type as discussed herein, or alternatively of the Si-rich type in different embodiments of this invention. Any and/or all of the silicon nitride layers discussed herein may be doped with other materials such as stainless steel or aluminum in certain example embodiments of this invention. For example, any and/or all silicon nitride layers discussed herein may optionally include from about 0-15% aluminum, more preferably from about 1 to 10% aluminum, most preferably from 14% aluminum, in certain example embodiments of this invention. The silicon nitride may be deposited by sputtering a target of Si or SiAl in certain embodiments of this invention. Moreover, silicon nitride layer 3 may be ion beam treated in any manner discussed herein (e.g., with at least nitrogen ions via IBAD) in order to reduce sodium migration from the glass substrate toward the IR reflecting layer(s) during HT.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting layers may, however, be slightly oxidized in certain embodiments of this invention. Dielectric layer 13 may be of or include tin oxide in certain example embodiments of this invention. However, as with other layers herein, other materials may be used in different instances. Lower contact layers 7 and/or 17 in certain embodiments of this invention are of or include zinc oxide (e.g., ZnO). The zinc oxide of layer(s) 7, 17 may contain other materials as well such as Al (e.g., to form $ZnAlO_x$). For example, in certain example embodiments of this invention, one or more of zinc oxide layers 7, 17 may be doped with from about 1 to 10% Al, more preferably from about 1 to 5% Al, and most preferably about 2 to 4% Al. The use of zinc oxide 7, 17 under the silver 9, 19 allows for an excellent quality of silver to be achieved. Upper contact layers 11 and/or 21 may be of or include NiCr, $NiCrO_x$ and/or the like in different example embodiments of this invention.

Dielectric layer 23 may be of or include tin oxide in certain example embodiments of this invention. However, layer 23 is optional and need not be provided in certain example embodiments of this invention. Silicon nitride overcoat layer 25 may be initially deposited by sputtering or IBAD, and may be ion beam treated in any manner discussed herein.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 3 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses and materials may be used in layers in different embodiments of this invention, example thicknesses and materials for the respective layers on the glass substrate 1 in the FIG. 3 embodiment are as follows, from the glass substrate 1 outwardly:

Example Materials/Thicknesses; FIG. 3 Embodiment

| Layer | Preferred Range (Å) | More Preferred (Å) | Example (Å) |
|---|---|---|---|
| Glass (1-10 mm thick) | | | |
| N-doped $Si_3N_4$ (layer 3) | 40-450 Å | 70-250 Å | 100 |
| $ZnO_x$ (layer 7) | 10-300 Å | 40-150 Å | 100 |
| Ag (layer 9) | 50-250 Å | 80-120 Å | 98 |
| $NiCrO_x$ (layer 11) | 10-100 Å | 30-45 Å | 35 |
| $SnO_2$ (layer 13) | 0-1,000 Å | 350-630 Å | 570 |
| $Si_xN_y$ (layer 14) | 50-450 Å | 90-150 Å | 120 |
| $ZnO_x$ (layer 17) | 10-300 Å | 40-150 Å | 95 |
| Ag (layer 19) | 50-250 Å | 80-220 Å | 96 |
| $NiCrO_x$ (layer 21) | 10-100 Å | 30-45 Å | 35 |
| $SnO_2$ (layer 23) | 0-750 Å | 150-300 Å | 200 |
| N-doped $Si_3N_4$ (layer 25) | 10-750 Å | 100-320 Å | 180 |

An example advantage of certain embodiments of this invention is that ion beam treatment of silicon nitride layer 3 may permit a lesser thickness layer 3 to be used while still providing sufficient sodium migration barrier and/or antireflection properties. This may be advantageous in that a lesser thickness for layer 3 may permit visible transmission to be increased in certain example instances which is sometimes desirable.

Figure 4A:
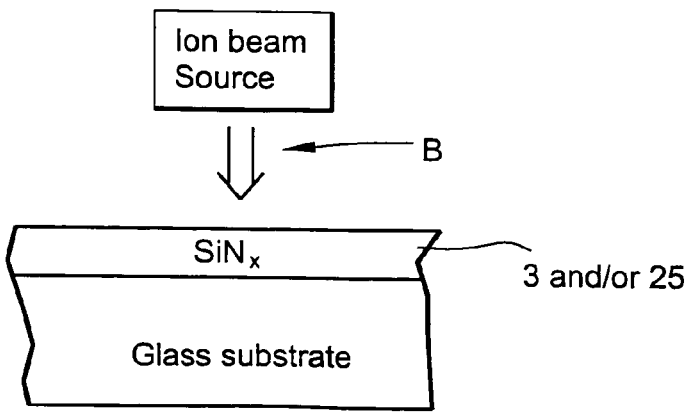
FIGS. 4(a) and 4(b) are cross sectional views illustrating different techniques for ion beam treating silicon nitride (e.g., in the context of a base layer and/or overcoat layer) with at least nitrogen ions according to example embodiments of this invention.
Figure 4B:
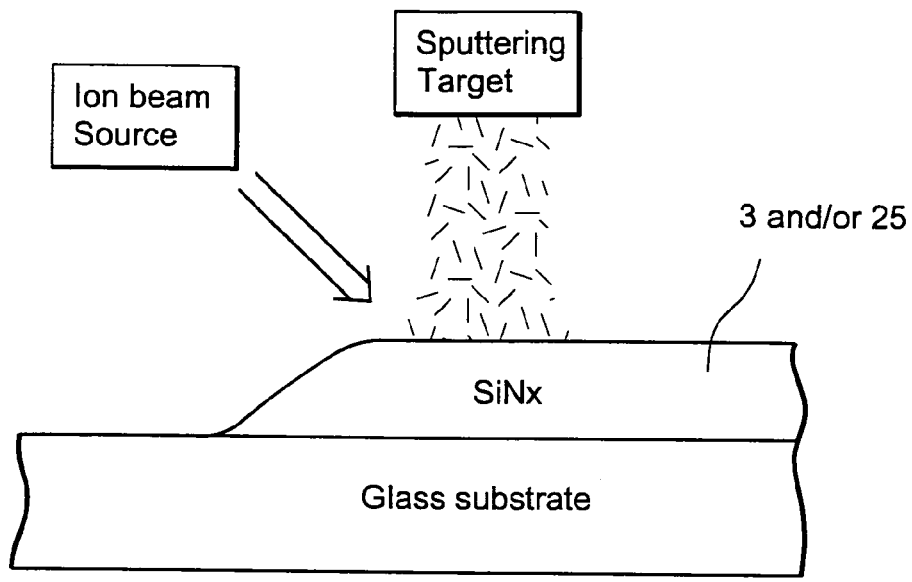

Referring to FIGS. 24 and 6-8, an example method for making a coated article according to an example embodiment of this invention will now be described. Initially, a glass substrate 1 is provided. Silicon nitride layer 3 is then formed on the substrate either via magnetron sputtering or via a combination of sputtering and ion beam treatment (e.g., via IBAD). As discussed above, the ion beam treatment of silicon nitride layer 3 may be performed via IBAD and/or peening in different embodiments of this invention. FIG. 4(a) illustrates an example of ion beam treatment via peening, whereas FIGS. 4(b) and 8 illustrate an example of ion beam treatment via IBAD where the ion beam treatment occurs simultaneously with sputtering and the sputtered material from the target (e.g., Si or SiAl inclusive sputtering target) and the ion beam intersect proximate the surface where the layer is being formed.

Following formation of silicon nitride inclusive layer 3, underlying layers 7, 9, 11, 13, 14, 17, 19, 21 and 23 are sputter deposited on the glass substrate 1 in this order as shown in FIG. 3. Then, overcoat silicon nitride layer 25 is deposited on the substrate 1 over the underlying layers. As discussed above, the ion beam treatment of layer 25 may be performed via IBAD and/or peening in different embodiments of this invention. FIG. 4(a) illustrates an example of ion beam treatment via peening, whereas FIGS. 4(b) and 8 illustrate an example of ion beam treatment via IBAD where the ion beam treatment occurs simultaneously with sputtering and the sputtered material from the target (e.g., Si or SiAl inclusive sputtering target) and the ion beam intersect proximate the surface where the layer is being formed.

In post-sputter deposited peening embodiments, referring to FIG. 4(a) for example, after a silicon nitride layer (3 and/or 25) has originally been sputter deposited, the originally deposited layer is ion beam treated with an ion beam B as shown in FIG. 4(a) to form ion beam treated layer. The ion beam B includes injecting at least nitrogen ions into the silicon nitride layer so as to cause at least one of the following to occur in the layer due to the ion beam treatment: (a) formation of nitrogen-doped $Si_3N_4$ in at least part of the layer, thereby reducing Si dangling bonds and susceptibility to oxidation; (b) creating a nitrogen graded layer in which the nitrogen content is greater in an outer portion of the layer closer to the layer's outer surface than in a portion of the layer further from the layer's outer surface; (c) improving anti-migration characteristics of the layer so that the layer is a better inhibitor of sodium migration during HT; (d) increasing the density of the layer which has been ion beam treated, (e) stress characteristics of the layer to be improved, and/or (f) reducing the amount and/or size of voids in the layer.

In certain post-sputtering peening embodiments (e.g., see FIG. 4(a)), it is desirable to sputter-deposit the silicon nitride layer in Si-rich form prior to ion beam treating so as to be characterized by $SiN_x$, where x is no greater than 1.30 (more preferably no greater than 1.20, even more preferably no greater than 1.10, still more preferably no greater than 1.00). Then, after ion beam treatment with nitrogen ions during peening as shown in FIG. 4(a), the silicon nitride becomes more stoichiometric (i.e., x moves toward 1.33). Stoichiometric silicon nitride is characterized by $Si_3N_4$ (i.e., x is 4/3=1.33). In certain example embodiments, following ion beam treatment the silicon nitride layer(s) (e.g., 3 and/or 25) may comprise $Si_3N_4$ which is additionally doped with more nitrogen (i.e., N-doped $Si_3N_4$). In certain example embodiments, the $Si_3N_4$ may be doped with at least 0.1% (atomic %) nitrogen, more preferably from about 0.5 to 20% nitrogen, even more preferably from about 1 to 10% nitrogen, and most preferably from about 2 to 10% nitrogen (or excess nitrogen). In certain example instances, the nitrogen doping may be at least about 2% nitrogen doping. Unlike the nitrogen in the $Si_3N_4$ of the layer, the excess nitrogen (or the doping nitrogen referenced above) is not bonded to Si (but may or may not be bonded to other element(s)). This nitrogen doping of $Si_3N_4$ may be present in either the entire layer comprising silicon nitride, or alternatively in only a part of the layer comprising silicon nitride (e.g., proximate an upper surface thereof in peening embodiments).

In IBAD embodiments, FIGS. 4(b) and 8 illustrate that the ion beam treatment is performed simultaneously with sputtering of layer 3 and/or 25. Referring to FIG. 8 in particular, this example embodiment of IBAD uses ion beam assisted sputtering where the deposition device includes both a linear ion beam source(s) 26 and at least one sputtering cathode (e.g., magnetron cathode) 50 in a vacuum chamber or deposition chamber where the ion beam treated layer is deposited by a combination of sputtering and ion beam treatment. The ion beam B (including energetic ions) from the ion source 26 and the particles from the sputtering target(s) impinge upon the substrate or layer being formed in a common area. Preferably, the ion beam B is angled relative to a surface of the substrate at an angle of from about 40 to 70 degrees so as to intersect the sputtered particles proximate the substrate surface. While the substrate support in FIG. 8 is illustrated as being a rotating support, a linear-moving conveying support may be more appropriate in certain example embodiments of this invention. Again, the ion beam treatment using IBAD results in at least nitrogen ions being injected into the silicon nitride layer so as to cause at least one of the following to occur in the layer (3 and/or 25) due to the ion beam treatment: (a) formation of nitrogen-doped $Si_3N_4$ in at least part of the layer (preferably throughout the layer), thereby reducing Si dangling bonds and susceptibility to oxidation; (b) improving anti-migration characteristics of the layer so that the layer is a better inhibitor of sodium migration during HT; (c) increasing the density of the layer which has been ion beam treated, (d) stress characteristics of the layer to be improved, and/or (e) reducing the amount and/or size of voids in the layer.

In certain example embodiments of this invention, one or both of NiCr or $NiCrO_x$ layers 11 and/or 21 may be ion beam treated using at least oxygen ions in order to oxidation grade as described in U.S. Ser. No. 10/847,672, filed May 18, 2004, the entire disclosure of which is hereby incorporated herein by reference.

Referring to FIGS. 2, 4 and 6-8, the ion beam B is generated by ion source 26, and introduces at least nitrogen ions into the silicon nitride layer (3 and/or 25). As explained above, an anode-cathode energy at the source is utilized which translates into an ion energy suitable to cause the stress of the silicon nitride layer to end up compressive, or to cause tensile stress to be reduced due to the ion beam treatment. In certain example embodiments of this invention (whether peening or IBAD is used), the ion beam treatment may be from about 1-30 seconds, more preferably from about 1-20 seconds, to achieve desired results.

Figure 6:
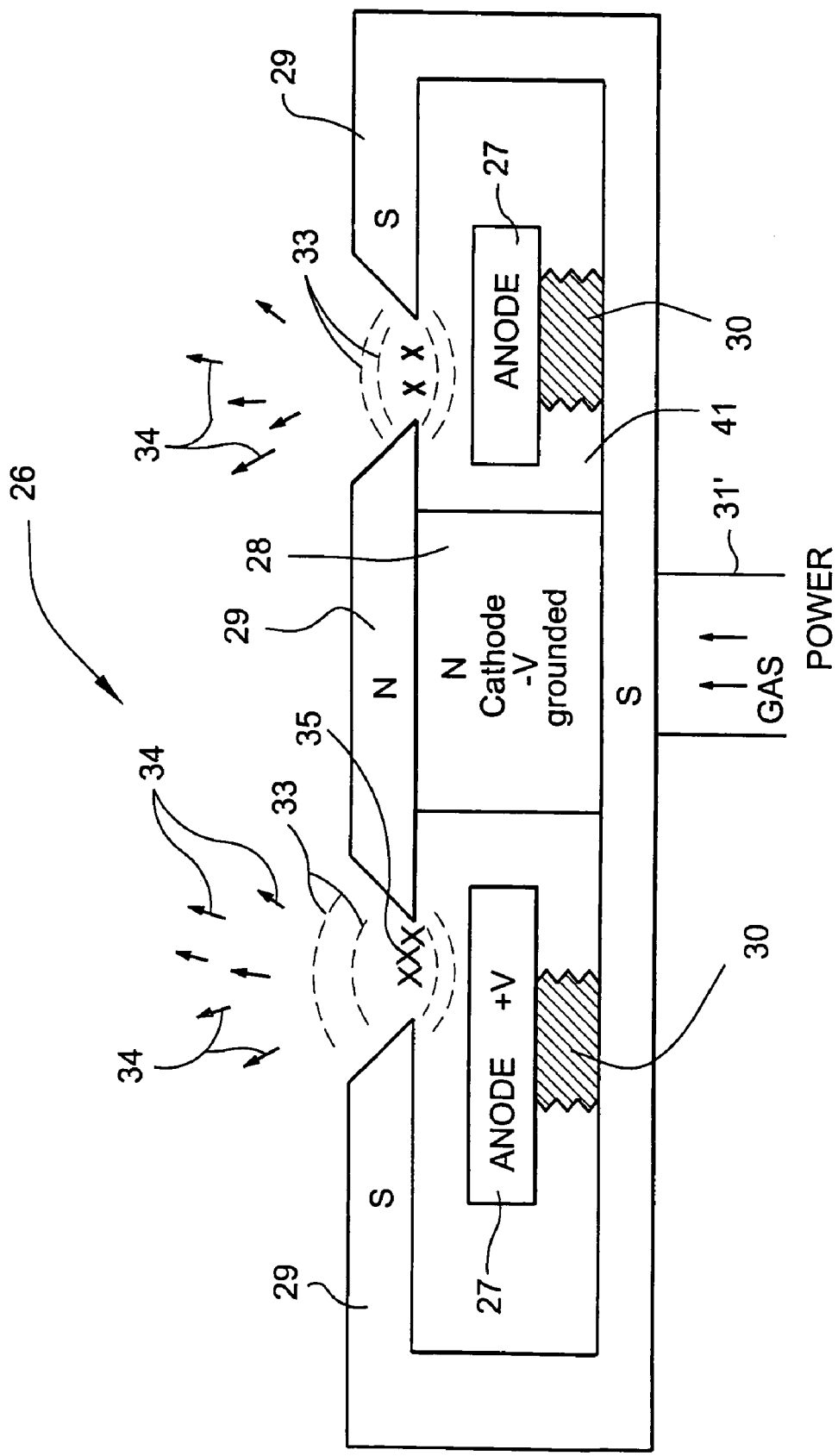
FIG. 6 is a cross sectional view of an example ion source that may be used to ion beam treat layers according to example embodiments of this invention.
Figure 7:
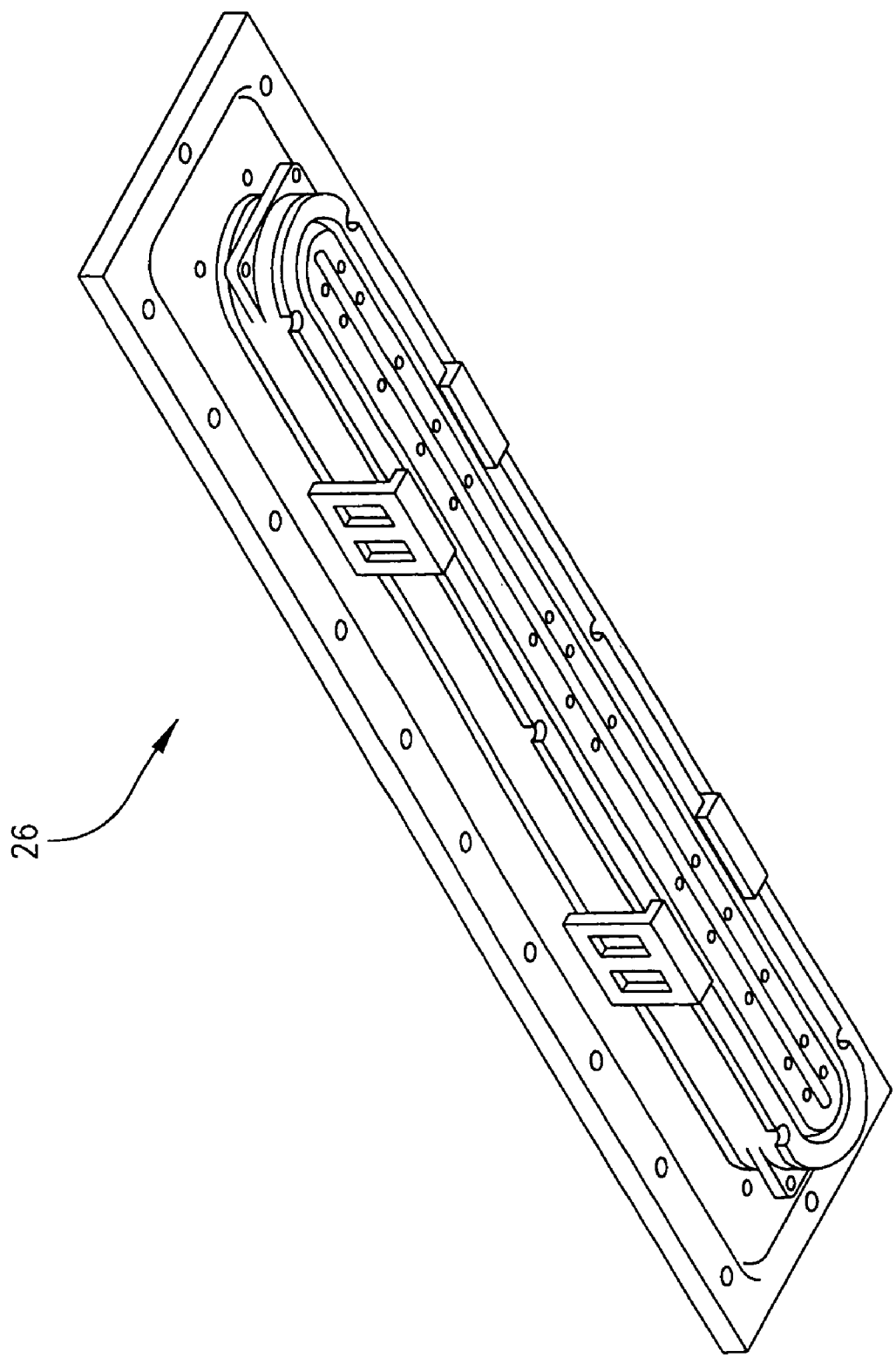
FIG. 7 is a perspective view of the ion source of FIG. 6.

FIGS. 6-7 illustrate an exemplary linear or direct ion beam source 26 which may be used to ion beam treat layer(s) 3 and/or 25 with at least nitrogen ions in certain example embodiments (peening or IBAD). Ion beam source (or ion source) 26 includes gas/power inlet 31, racetrack-shaped anode 27, grounded cathode magnet portion 28, magnet poles, and insulators 30. An electric gap is defined between the anode 27 and the cathode 29. A 3 kV or any other suitable DC power supply may be used for source 26 in some embodiments. The gas(es) discussed herein for use in the ion source during the ion beam treatment may be introduced into the source via gas inlet 31, or via any other suitable location. Ion beam source 26 is based upon a known gridless ion source design. The linear source may include a linear shell (which is the cathode and grounded) inside of which lies a concentric anode (which is at a positive potential). This geometry of cathode-anode and magnetic field 33 may give rise to a close drift condition. Feedstock gases (e.g., nitrogen, argon, oxygen, a mixture of nitrogen and argon, etc.) may be fed through the cavity 41 between the anode 27 and cathode 29. The electrical energy between the anode and cathode cracks the gas to produce a plasma within the source. The ions 34 (e.g., nitrogen ions) are expelled out (e.g., due to the nitrogen gas in the source) and directed toward the layer to be ion beam treated in the form of an ion beam. The ion beam may be diffused, collimated, or focused. Example ions 34 in beam (B) are shown in FIG. 6.

A linear source as long as 0.5 to 4 meters may be made and used in certain example instances, although sources of different lengths are anticipated in different embodiments of this invention. Electron layer 35 is shown in FIG. 6 and completes the circuit thereby permitting the ion beam source to function properly. Example but non-limiting ion beam sources that may be used to treat layers herein are disclosed in U.S. Patent Document Nos. 6,303,226, 6,359,388, and/or 2004/0067363, all of which are hereby incorporated herein by reference.

In certain example embodiments of this invention, coated articles herein may have the following optical and solar characteristics when measured monolithically (before any optional HT). The sheet resistances ($R_s$) herein take into account all IR reflecting layers (e.g., silver layers 9, 19).

| Optical/Solar Characteristics (Monolithic; pre-HT) | | | |
|---|---|---|---|
| Characteristic | General | More Preferred | Most Preferred |
| $R_s$ (ohms/sq.): | <=6.0 | <=3.0 | <=2.8 |
| $E_n$: | <=0.09 | <=0.04 | <=0.03 |
| $T_{vis}$ (Ill. C 2°): | >=70% | >=75% | >=75.5% |

In certain example embodiments, coated articles herein may have the following characteristics, measured monolithically for example, after heat treatment (HT):

| Optical/Solar Characteristics (Monolithic; post-HT) | | | |
|---|---|---|---|
| Characteristic | General | More Preferred | Most Preferred |
| $R_s$ (ohms/sq.): | <=5.5 | <=2.5 | <=2.1 |
| $E_n$: | <=0.08 | <=0.04 | <=0.03 |
| $T_{vis}$ (Ill. C 2°): | >=70% | >=75% | >=80% |
| Haze: | <=0.40 | <=0.35 | <=0.30 |

Moreover, in certain example laminated embodiments of this invention, coated articles herein which have been heat treated to an extent sufficient for tempering and/or heat bending, and which have been laminated to another glass substrate, may have the following optical/solar characteristics:

| Optical/Solar Characteristics (Laminated; post-HT) | | | |
|---|---|---|---|
| Characteristic | General | More Preferred | Most Preferred |
| $R_s$ (ohms/sq.): | <=5.5 | <=2.5 | <=2.1 |
| $E_n$: | <=0.08 | <=0.04 | <=0.03 |
| $T_{vis}$ (Ill. D65 10°): | >=70% | >=75% | >=77% |
| Haze: | <=0.45 | <=0.40 | <=0.36 |

Moreover, coated articles including coatings according to certain example embodiments of this invention have the following optical characteristics (e.g., when the coating(s) is provided on a clear soda lime silica glass substrate 1 from 1 to 10 mm thick; e.g., 2.1 mm may be used for a glass substrate reference thickness in certain example non-limiting instances) (laminated).

| Example Optical Characteristics (Laminated: post-HT) | | |
| --- | --- | --- |
| Characteristic | General | More Preferred |
| $T_{vis}$ (or TY)(Ill. D65 10°): | >=75% | >=77% |
| $a^*_f$ (Ill. D65 10°): | −6 to +1.0 | −4 to 0.0 |
| $b^*_f$ (Ill. D65 10°): | −2.0 to +8.0 | 0.0 to 4.0 |
| $L^*$ (Ill. D65 10°): | 88-95 | 90-95 |
| $R_fY$ (Ill. C, 2 deg.): | 1 to 12% | 1 to 10% |
| $a^*_f$ (Ill. C, 2°): | −5.0 to +2.0 | −3.5 to +0.5 |
| $b^*_f$ (Ill. C, 2°): | −14.0 to +10.0 | −10.0 to 0 |
| $L^*$ (Ill. C 2°): | 30-40 | 33-38 |
| $R_gY$ (Ill. C, 2 deg.): | 1 to 12% | 1 to 10% |
| $a^*_g$ (Ill. C, 2°): | −5.0 to +2.0 | −2 to +2.0 |
| $b^*_g$ (Ill. C, 2°): | −14.0 to +10.0 | −11.0 to 0 |
| $L^*$ (Ill. C 2°): | 30-40 | 33-38 |

The following examples are provided for purposes of example only and are not intended to be limiting.

EXAMPLES 1-3

Examples 1-3 illustrate example techniques for forming layers 3 and/or 25, or any other suitable layer according to example embodiments of this invention. Examples 1-3 utilized IBAD type of ion beam treatment, and were made and tested as follows. A silicon nitride layer was deposited on a quartz wafer (used for ease of stress testing) using IBAD (e.g., see FIG. 8) under the following conditions in the deposition chamber: pressure of 2.3 mTorr; anode/cathode ion beam source voltage of about 800 V; Ar gas flow in the ion source of 15 sccm; $N_2$ gas flow in the ion source 26 of 15 sccm; sputtering target of Si doped with about 1% boron; 460 V applied to sputtering cathode; 5.4 sputtering amps used; 60 sccm Ar and 40 sccm $N_2$ gas flow used for sputtering gas flow; linear line speed of 50 inches/minute; where the quartz wafer substrate was circular in shape and about 0.1 to 0.15 mm thick. The ion beam treatment time for a given area was about 3 seconds.

Example 2 was the same as Example 1, except that the anode/cathode voltage in the ion source was increased to 1,500 V.

Example 3 was the same as Example 1, except that the anode/cathode voltage in the ion source was increased to 3,000 V.

The stress results of Examples 1-3 were as follows, and all realized compressive stress:

| Example | Compressive Stress | Ion Source Anode/Cathode Volts |
| --- | --- | --- |
| 1 | 750 MPa | 800 V |
| 2 | 1.9 GPa | 1,500 V |
| 3 | 1 GPa | 3,000 V |

It can be seen from Examples 1-3 that the compressive stress of the silicon nitride layer realized due to IBAD deposition is a function of ion energy (i.e., which is a function of voltage applied across the anode/cathode of the ion source 26). In particular, 1,500 anode-cathode volts caused the highest compressive stress to be realized, whereas when too much voltage was applied the stress value began moving back toward tensile.

EXAMPLE 4

Example 4 used post-sputtering peening type of ion beam treatment, and was made and tested as follows. A silicon nitride layer about 425 Å thick was deposited by conventional magnetron-type sputtering using a Si target doped with Al on a substrate. After being sputter-deposited, the silicon nitride layer had a tensile stress of 400 MPa as tested on the quartz wafer. After being sputter-deposited and stress tested, the silicon nitride layer was ion beam treated using an ion source 26 as shown in FIGS. 6-7 under the following conditions: ion energy of 750 eV per N ion; treatment time of about 18 seconds (3 passes at 6 seconds per pass); and $N_2$ gas used in the ion source. After being ion beam treated, the silicon nitride layer was again tested for stress, and had a tensile stress of only 50 MPa. Thus, the post-sputtering ion beam treatment caused the tensile stress of the silicon nitride layer to drop from 400 MPa down to 50 MPa (a drop of 87.5%).

EXAMPLE 5

The following hypothetical Example 5 is provided for purposes of example only and without limitation, and uses a 2.1 mm thick clear glass substrates so as to have approximately the layer stack set forth below and shown in FIG. 3. The layer thicknesses are approximations, and are in units of angstroms (Å).

| Layer Stack for Example 5 | |
| --- | --- |
| Layer Glass Substrate | Thickness (Å) |
| N-doped $Si_3N_4$ | 100 |
| $ZnAlO_x$ | 109 |
| Ag | 96 |
| $NiCrO_x$ | 25 |
| $SnO_2$ | 535 |
| $Si_xN_y$ | 126 |
| $ZnAlO_x$ | 115 |
| Ag | 95 |
| $NiCrO_x$ | 25 |
| $SnO_2$ | 127 |
| N-doped $Si_3N_4$ | 237 |

The processes used in forming the coated article of Example 5 are set forth below. The sputtering gas flows (argon (Ar), oxygen (O), and nitrogen (N)) in the below table are in units of sccm (gas correction factor of about 1.39 may be applicable for argon gas flows herein), and include both tuning gas and gas introduced through the main. The line speed was about 5 m/min. The pressures are in units of mbar×$10^{-3}$. The silicon (Si) targets, and thus the silicon nitride layers, were doped with aluminum (Al). The Zn targets in a similar manner were doped with about 2% Al.

| Sputtering Process Used in Example 5 | | | | | | | |
| --- | --- | --- | --- | --- | --- | --- | --- |
| Cathode | Target | Power (kW) | Ar | O | N | Volts | Pressure |
| IBAD | N-doped $Si_3N_4$ layer 3 formed using any of Examples 1-4 | | | | | | |
| C14 | Zn | 19.5 | 250 | 350 | 0 | 276 | 2.24 |
| C15 | Zn | 27.8 | 250 | 350 | 0 | 220 | 1.88 |
| C24 | Ag | 9.2 | 250 | 0 | 0 | 541 | 1.69 |
| C25 | NiCr | 16.5 | 350 | 0 | 0 | 510 | 2.33 |
| C28 | Sn | 27.3 | 250 | 454 | 350 | 258 | 2.30 |
| C29 | Sn | 27.3 | 250 | 504 | 350 | 246 | 1.97 |
| C39 | Sn | 30 | 250 | 548 | 350 | 257 | 2.29 |
| C40 | Sn | 28.5 | 250 | 458 | 350 | 245 | 2.20 |
| C41 | Sn | 30.8 | 250 | 518 | 350 | 267 | 2.45 |
| C43 | Si | 59.7 | 350 | 0 | 376 | 285 | 2.47 |
| C45 | Zn | 26.9 | 250 | 345 | 0 | 209 | 3.78 |

-continued

Sputtering Process Used in Example 5

| Cathode | Target | Power (kW) | Ar | O | N | Volts | Pressure |
|---|---|---|---|---|---|---|---|
| C46 | Zn | 26.8 | 250 | 345 | 0 | 206 | 1.81 |
| C49 | Ag | 9.8 | 150 | 0 | 0 | 465 | 1.81 |
| C50 | NiCr | 16.6 | 250 | 75 | 0 | 575 | 1.81 |
| C54 | Sn | 47.3 | 250 | 673 | 350 | 314 | 1.92 |
| IBAD | N-doped $Si_3N_4$ layer 25 formed using any of Examples 1-4 | | | | | | |

It can be seen that in the aforesaid Example 5 both of silicon nitride layers 3 and 25 were ion beam treated in a manner so as to cause N-doping of N-doped $Si_3N_4$ to occur in each of the layers. However, although only one (either one) of such layers needs to be ion beam treated in certain other embodiments of thins invention.

After being sputter deposited onto the glass substrates, the Example 5 coated article was heat treated in a manner sufficient for tempering and heat bending, and following this heat treatment had the following characteristics as measured in monolithic form.

Characteristics of Example 5 (Monolithic; post - HT)

| Characteristic | Example 5 |
|---|---|
| Visible Trans: ($T_{vis}$ or TY)(Ill. C 2 deg.): | 80.0% |
| a* | −4.8 |
| b* | 10.7 |
| Glass Side Reflectance (RY)(Ill C, 2 deg.): | 8.3% |
| a* | −3.5 |
| b* | 7.8 |
| Film Side Reflective (FY)(Ill. C, 2 deg.): | 7.5% |
| a* | −5.8 |
| b* | 14.2 |
| $R_s$ (ohms/square) (pre-HT): | 2.74 |
| $R_s$ (ohms/square) (post-HT): | 2.07 |
| Haze: | 0.28 |

The coated article of Example 5 was then laminated to another corresponding heat treated and bent glass substrate to form a laminated vehicle windshield product. Following the lamination, the resulting coated article laminate (or windshield) had the following characteristics.

Characteristics of Example 5 (Laminated; post - HT)

| Characteristic | Example 5 |
|---|---|
| Visible Trans. ($T_{vis}$ or TY)(Ill. D65 10°): | 77.8% |
| a* | −3.1 |
| b* | 3.5 |
| Glass Side Reflectance (RY)(Ill C, 2 deg.): | 9.0% |
| a* | 1.5 |
| b* | −9.1 |
| Film Side Reflective (FY)(Ill. C, 2 deg.): | 8.9% |
| a* | −1.1 |
| b* | −7.8 |
| $R_s$ (ohms/square): | see above |
| Haze: | 0.32 |

While the aforesaid Examples ion beam treat layers comprising silicon nitride, this invention is not so limited. Other layers may be ion beam treated for grading or otherwise ion beam treated in a similar manner.

Figure 5:
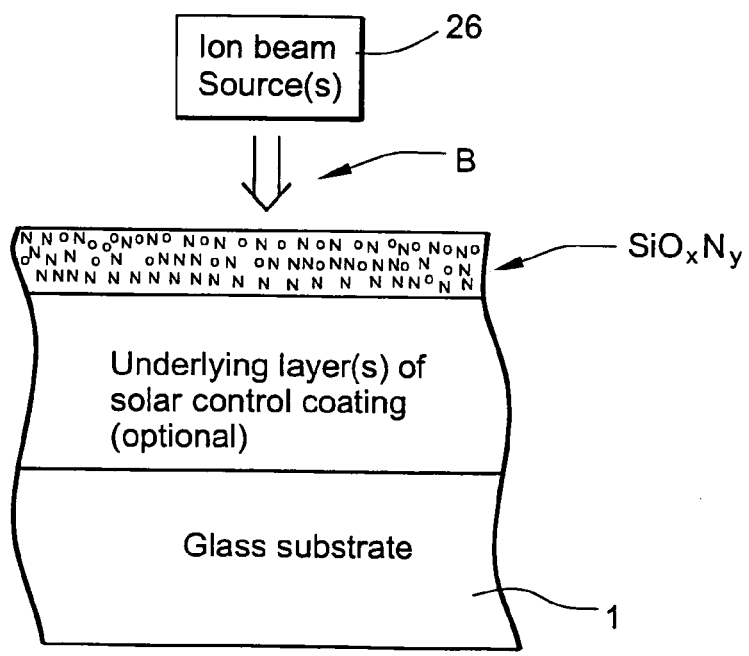
FIG. 5 is a cross sectional view of a coated article according to another example embodiment of this invention, where a silicon nitride layer (e.g., overcoat, base layer, or the like) is being ion beam treated with at least oxygen ions to form a layer comprising silicon oxynitride which may be oxidation graded in certain example instances.

Additionally, while the aforesaid embodiments use at least nitrogen ions to ion beam treat layers of or including silicon nitride, this invention is not so limited. In this regard, for example, FIG. 5 illustrates another example embodiment of this invention. The FIG. 5 embodiment is the same as any peening embodiment described above, except that oxygen ions are used to ion beam treat any suitable silicon nitride layer (e.g., for any of layers 3 and/or 25). In this embodiment, the ion beam treating of the silicon nitride overcoat or other suitable layer transforms the layer into a silicon oxynitride layer. This may be advantageous in certain example instances, because this could result in a coated article having higher visible transmission and/or less reflectance. In FIG. 5, the "o" elements in the silicon oxynitride layer represent oxygen, whereas the "N" elements in the layer represent nitrogen. In FIG. 5, the silicon oxynitride layer is oxidation graded due to the ion beam treatment so that the layer is less oxided at a location closer to the underlying layer(s) than at a position further from the underlying layer(s). In other words, in oxidation graded embodiments, there is more oxygen in the layer provided closer to the exterior surface of the coated article than at a location at an inwardly located portion of the silicon oxynitride layer; this is because the ion energy used in the ion beam treatment causes many of the oxygen ions to penetrate the layer but not go all the way therethrough with many of the oxygen ions ending up near the outer portion of half of the layer. In certain example embodiments, only oxygen gas is fed through the ion source in this embodiment, whereas it is also possible to use other gases in addition to oxygen in certain alternative embodiments.

Thus, in the FIG. 5 embodiment where the silicon oxynitride layer is oxidation graded, the ion energy is chosen so that the oxygen ions do not all penetrate the entire thickness of the layer being treated. In other words, an ion energy is chosen so that a portion of the layer is more oxidized further from the substrate than is a portion of the layer closer to the substrate. In still further embodiments of this invention, a combination of both oxygen and nitrogen gas may be used in IBAD embodiments discussed above for ion beam treatment of certain layers such as layers sputtered from Si inclusive targets (this could also be used to form a silicon oxynitride layer).

In certain other embodiments of this invention, any of the aforesaid embodiments may be applied to other coatings. For example and without limitation, any of the aforesaid embodiments may also be applied to coated articles and thus solar control coatings of one of more of U.S. Patent Document Nos. 2003/0150711, 2003/0194570, U.S. Pat. Nos. 6,723,211, 6,576,349, 5,514,476, 5,425,861, all of which are hereby incorporated herein by reference. In other words, the overcoat layers and/or lower silicon nitride layers of any of 2003/0150711, 2003/0194570, U.S. Pat. Nos. 6,723,211, 6,576,349, 5,514,476, and/or 5,425,861, or any other suitable coating, may be ion beam treated according to any of the aforesaid embodiments of this invention.

While many of the above-listed embodiments are used in the context of coated articles with solar control coatings, this invention is not so limited. For example, ion beam treating of layers as discussed herein may also be used in the context of other types of product and coatings relating thereto.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a glass substrate which supports a coating thereon, the coating comprising at least the following layers:
   an ion beam-treated layer comprising silicon nitride supported by the glass substrate;
   an IR reflecting layer located on and supported by the substrate, the IR reflecting layer being located over at least the layer comprising silicon nitride; and
   wherein the ion beam-treated layer comprising silicon nitride comprises nitrogen-doped $Si_3N_4$.

2. The coated article of claim 1, wherein the layer comprising nitrogen-doped $Si_3N_4$ is doped with at least 2% nitrogen.

3. The coated article of claim 1, wherein the coated article has a visible transmission of at least about 70% and a sheet resistance of less than or equal to about 6 ohms/square.

4. The coated article of claim 1, wherein the layer comprising silicon nitride is located in direct contact with the glass substrate.

5. The coated article of claim 1, further comprising an overcoat layer comprising silicon nitride located on the substrate over at least the IR reflecting layer, wherein the overcoat layer comprising silicon nitride has compressive stress.

6. The coated article of claim 1, wherein the IR reflecting layer comprises silver.

7. The coated article of claim 1, further comprising a layer comprising zinc oxide, wherein the IR reflecting layer is located over and contacts the layer comprising zinc oxide.

8. The coated article of claim 1, wherein the layer comprising silicon nitride has compressive stress and is ion beam treated.

9. The coated article of claim 1, wherein the coating comprises first and second layers comprising silver with at least one dielectric layer provided therebetween.

10. The coated article of claim 1, wherein the coated article is heat treated, has a visible transmission of at least 70% and a sheet resistance ($R_s$) of no greater than 5.5 ohms/square.

11. The coated article of claim 1, further comprising an oxidation graded layer comprising NiCr contacting the IR reflecting layer.

12. The coated article of claim 1, wherein the layer comprising silicon nitride further includes at least one of aluminum and oxygen.

13. The coated article of claim 1, wherein the coated article is a window.

14. The coated article of claim 1, wherein the layer comprising silicon nitride has an average hardness of at least 20 GPa.

15. The coated article of claim 1, wherein the layer comprising silicon nitride has an average hardness of at least 24 GPa.

16. A coated article including a glass substrate which supports a coating thereon, the coating comprising at least the following layers:
   a layer comprising nitrogen-doped silicon nitride which has an average hardness of at least 22 GPa, wherein the nitrogen-doped silicon nitride is doped with at least 2% nitrogen;
   an IR reflecting layer located on the substrate over at least the layer comprising silicon nitride; and
   wherein the coated article has a visible transmission of at least about 70% and a sheet resistance of less than or equal to about 6 ohms/square.

17. The coated article of claim 16, wherein the layer comprising silicon nitride has an average hardness of at least 24 GPa.

18. The coated article of claim 16, wherein the coated article is thermally tempered.

19. The coated article of claim 16, wherein the layer comprising silicon nitride comprises nitrogen-doped $Si_3N_4$.

20. A coated article including a glass substrate which supports a coating thereon, the coating comprising at least the following layers:
   a layer comprising silicon nitride supported by the glass substrate;
   an IR reflecting layer located on and supported by the substrate, the IR reflecting layer being located over at least the layer comprising silicon nitride;
   wherein the layer comprising silicon nitride comprises nitrogen-doped $Si_3N_4$, and wherein at least some excess nitrogen present in the layer due to doping is not bonded to silicon.

21. The coated article of claim 1, wherein the ion beam-treated layer is nitrogen ion beam-treated.

* * * * *